United States Patent
Sundareson et al.

(10) Patent No.: US 7,085,957 B2
(45) Date of Patent: Aug. 1, 2006

(54) UPGRADING OF FIRMWARE WITH TOLERANCE TO FAILURES

(75) Inventors: Prabindh Sundareson, Balaji Nagar Tiruparankundram (IN); Krishnakumar Gopalakrishnan, Aristo Junction Thampanoor (IN)

(73) Assignee: Texas Instruments Incorporated, Dallas, TX (US)

( * ) Notice: Subject to any disclaimer, the term of this patent is extended or adjusted under 35 U.S.C. 154(b) by 515 days.

(21) Appl. No.: 10/300,580

(22) Filed: Nov. 21, 2002

(65) Prior Publication Data

US 2004/0103340 A1    May 27, 2004

(51) Int. Cl.
*G06F 11/00* (2006.01)
*G06F 9/44* (2006.01)

(52) U.S. Cl. ............................ 714/6; 717/168; 717/170
(58) Field of Classification Search ................ 717/168, 717/170; 714/6, 36
See application file for complete search history.

(56) References Cited

U.S. PATENT DOCUMENTS

| | | | |
|---|---|---|---|
| 5,922,072 A * | 7/1999 | Hutchinson et al. ........... 713/2 |
| 6,104,506 A * | 8/2000 | Hirokawa .................... 358/444 |
| 6,324,692 B1 * | 11/2001 | Fiske ......................... 717/171 |
| 6,457,175 B1 * | 9/2002 | Lerche ........................ 717/173 |
| 6,591,376 B1 * | 7/2003 | VanRooven et al. ........... 714/36 |
| 6,681,390 B1 * | 1/2004 | Fiske ......................... 717/173 |
| 6,684,396 B1 * | 1/2004 | Brittain et al. .............. 717/168 |
| 6,728,956 B1 * | 4/2004 | Ono ............................ 717/168 |
| 6,836,657 B1 * | 12/2004 | Ji et al. ...................... 455/419 |
| 2002/0042892 A1 * | 4/2002 | Gold ............................. 714/6 |
| 2002/0092010 A1 * | 7/2002 | Fiske ......................... 717/168 |
| 2004/0158817 A1 * | 8/2004 | Okachi et al. .............. 717/122 |

* cited by examiner

*Primary Examiner*—Robert Beausoliel
*Assistant Examiner*—Christopher McCarthy
(74) *Attorney, Agent, or Firm*—Robert D. Marshall, Jr.; W. James Brady; Frederick J. Telecky, Jr.

(57) ABSTRACT

The firmware may contain multiple application modules, which can operate independent of each other such that upgrade of one application module does not affect the operation of the other. A compressed backup copy of a module is stored in a non-volatile memory before upgrading the module from a previous version to a newer version. If the upgrading operation fails, the backup copy is used to restore the previous version. To simplify the upgrading or restoring operations, each application module may be assigned to a pre-specified area of a non-volatile memory forming a firmware. As a result, upgrading or restoring may merely require replacing of a version in the firmware. Compression of the backup copy may be optional with status data indicating whether the backup copy is compressed.

4 Claims, 2 Drawing Sheets

UPGRADING OF FIRMWARE WITH TOLERANCE TO FAILURES

BACKGROUND OF THE INVENTION

1. Field of the Invention

The present invention relates to embedded systems, and more specifically to a method and apparatus for upgrading firmware with tolerance to failures.

2. Related Art

Embedded systems generally refer to specialized systems used to control devices such as automobiles, home and office appliances, and handheld units (e.g., cell phones). Embedded systems are often characterized by limited memory at least due to reasons such as limited availability of space, cost, etc., as is well known in the relevant arts.

Embedded systems are often implemented with firmware to control the operation of various components (contained in the system). Firmware generally refers to a non-volatile memory (e.g., flash memory, programmable read only memory) which stores software. The software is executed to control the operation of the components. By providing non-volatile storage, the software continues to be available for use even after a system is switched off.

The software (in the firmware) is often implemented in the form of multiple application modules (each module having software instructions). It is sometimes desirable to upgrade application modules in an embedded system. The upgrading may be performed, for example, to add a new feature or to fix a recognized problem (bug). Various approaches are known in the prior art to perform such upgrades, with each approach having associated problems.

In one approach, a configuration-software manager/software executing on a personal computer (PC) downloads an upgrade file to an embedded system. The upgrade file contains the data necessary to upgrade the firmware (of application modules), and the downloaded data is processed to perform the desired download. The embedded system may be connected to the PC using any of the connecting technologies such as USB, etc.

One problem with such an approach is that the connection to the PC needs to be operational until the upgrading operation is completed (or at least the downloading is complete). If the connection fails in the middle of an upgrading operation, a system may cease to operate properly. Such failure of a connection may be caused by the sudden unavailability of a power source. Restoring operational status (of the system after the failure) may present challenges, for example, in a situation when communication drivers (software supporting the connection) are corrupted due to the partial upgrade.

Similar problem may be presented in an alternative approach, in which an upgrade file is provided on a medium such as a compact disc (CD), and an appropriate drive (provided as a part of the system) may retrieve the data in the upgrade file. The retrieved data is used to upgrade the firmware. If the upgrading operation aborts in the middle, the system may become non-operational, and drivers (software) necessary for the operation of the drive may be corrupted. As in the previous approach, restoring operational status of the system may present challenges due to the corrupted drivers.

What is therefore required is a method and apparatus for upgrading firmware which is tolerant to potential failures encountered during such upgrading.

SUMMARY OF THE INVENTION

An aspect of the present invention provides an approach which is tolerant to failures when upgrading an application module contained in a firmware of an embedded system. A backup copy of the previous version may be stored in a non-volatile memory before upgrading the application module to a newer version. If the upgrading operation fails, the application module is restored to the previous version using the backup copy. As a result, the system may be tolerant to failures of upgrading operations.

According to another aspect of the present invention, the determining is performed each time the embedded system is initialized. In an embodiment, a boot loader causes the determining to be performed while the embedded system is being initialized such that the application module can be restored before any application modules attempt to execute. Thus, a system may easily recover from failures of upgrades of application modules (possibly containing communication drivers or disk driver drivers).

One more aspect of the present invention takes advantage of implementations in which the application modules are designed to operate independent of each other such that an upgrade of one application module does not affect the operation of another module. As a result, different application modules may operate at different versions, and reverting back to previous versions may not impact other application modules operating at newer versions. In addition, by splitting the software into multiple application modules, an embedded system may operate with limited memory with respect to software upgrades.

In one implementation, each application module is allocated to a specified portion of a non-volatile memory. As a result, upgrading or restoring previous version may merely require replacing a version stored in the corresponding portion with another version. The same non-volatile memory unit may be used to store the backup copy also such that a single non-volatile memory is used for the upgrades as well as storing the application modules.

The same non-volatile memory may be used to store status data indicating whether the upgrading has begun, but not completed. The restoring operation is performed if the status data indicates that the upgrading has begun but not completed. In addition, to minimize memory requirements, the backup copy may be stored in a compressed format.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

An aspect of the present invention provides an approach which enables an embedded system to be tolerant to various types of failures while upgrading a firmware. The embedded system stores a backup copy of an application module prior to upgrading the application module. After storing the backup copy, the application module is upgraded using an upgrade file. If upgrading (of the application module) operation fails in the middle, the application module is restored by copying back the backup copy. As a result, the embedded system continues to be in an operational status even if the upgrading operation fails in the middle.

In an embodiment, status information indicating that upgrading of the specific application module has not been completed, may be stored in a non-volatile memory. When a system powers-up (or starts operation), the non-volatile memory is examined for any incomplete upgrade operation, and the corresponding backup copy is used to restore the application module. As a result, the operation of an embedded system may easily be restored even if components such as communication drivers fail in the middle of an upgrade operation.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example System

Figure 1:
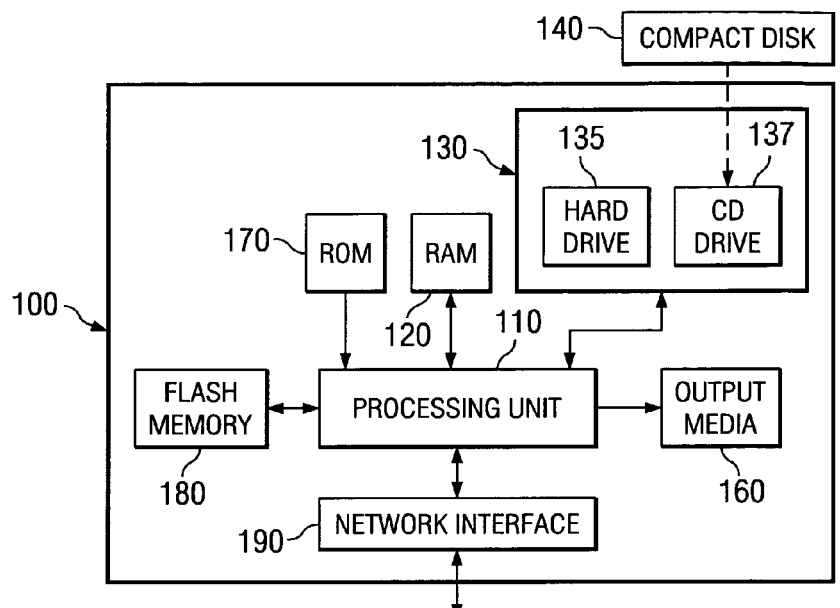
FIG. 1 is a block diagram of an example embedded system in which the present invention can be implemented.

FIG. 1 is a block diagram illustrating the details of an example system 100 in which the present invention can be implemented. System 100 may represent an MP3-player which plays a song represented by a data stream. System 100 is shown containing processing unit 110, random access memory (RAM) 120, secondary memory 130, output media 160, read only memory (ROM) 170, flash memory 180 and network interface 190. The components of FIG. 1 are described below in further detail.

Output media 160 may represent a speaker (and also a visual display) in case system 100 corresponds to an MP3 player. Output media 160 generates audible signals using digital data stream received from network interface 190 (via processing unit 110 and RAM 120). The data stream may be received from local storage media such as compact disk 140 as well. The audible signals may represent a song. Network interface 190 may be implemented in a known way using wireless or wire-based technologies using protocols such as TCP/IP.

ROM 170 and flash memory 180 provide non-volatile memory for storing various software instructions, which enable the operation of system 100. ROM 170 may be used to store portions of the software which generally need not be upgraded. An aspect of the present invention enables the software stored in flash memory 180 to be upgraded, as described in sections below.

Processing unit 110 may execute instructions provided from various secondary storage units (ROM 170, flash memory 180, and secondary memory 130) to provide several features of the present invention. Processing unit 110 may contain multiple units, with each unit potentially being designed for a specific task. Alternatively, processing unit 110 may contain only a single unit. RAM 120 provides a high speed memory for processing unit 110 to execute various instructions. The instructions may be initially loaded from ROM 170 or flash memory 180 prior to execution. In an embodiment, RAM 120 is integrated with (into) processing unit 110 as one unit.

Processing unit 110 may co-ordinate and control the operation of all the other components in system 100. For example, while playing a song, processing unit 110 may interface with network interface 190 to retrieve portions of a data stream, and the portion may be provided to output media 160. RAM 120 may be used for any necessary intermediate storage. Similarly, while upgrading the firmware (software instructions in flash memory 180), the instructions defining the logic of upgrading may be retrieved from ROM 170 and/or flash memory 180 (or any non-volatile storage, external or internal to system 100), and the necessary upgrade file from either network interface 190 or compact disk 140.

Secondary memory 130 also provides non-volatile storage storing various software instructions and data, which enable system 100 to provide several features related to both the operation by a user and the present invention. In the embodiment of FIG. 1, secondary memory 130 is shown containing hard drive 135 and CD (compact disk) drive 137. Compact disk 140 represents a removable storage unit, which can be used to provide data streams representing songs, and also software instructions executed by processing unit 110. However, secondary memory 130 may be implemented using various other media such as Floppy drive, magnetic tape drive, DVD Drive, removable memory chip (PCMCIA Card, EPROM).

The non-volatile data storage units (ROM 170, flash memory 180, and compact disk 140) include a computer usable storage medium having stored therein computer software and/or data. As noted above, if system 100 operates in playback mode, the software may cause audio signals to be generated based on data streams, and if system 100 operates in upgrade mode, the software may cause firmware to be upgraded based on an upgrade file received from compact disk 140. An embodiment of the present invention is implemented using software running (that is, executing) in system 100.

In this document, the term "computer program product" is used to generally refer to any one or more of the non-volatile data storage units providing software instructions to system 100. These computer program products are means for providing software to system 100. As noted above, processing unit 110 may retrieve the software instructions from such computer readable media, and execute the instructions to provide various features of the present invention. The features of the present invention are described below in detail with reference to more examples.

3. Method

Figure 2:
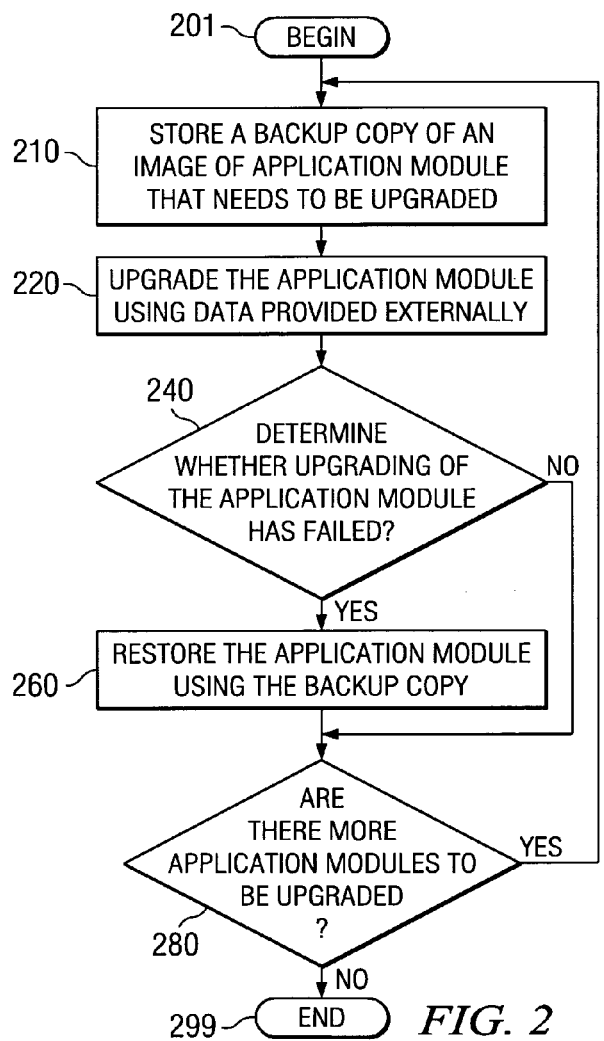
FIG. 2 is a flowchart illustrating a method using which a firmware may be upgraded in an embedded system according to an aspect of the present invention.

FIG. 2 is a flowchart illustrating a method using which the firmware may be upgraded in an embedded system according to an aspect of the present invention. The firmware contains multiple application modules of software instructions, with each application module being designed to perform a high level task independent of the operation of the other application modules. The method is described with reference to FIG. 1 for illustration. However, the method can be implemented in other embodiments without departing from the scope and spirit of the present invention, as will be apparent to one skilled in the relevant arts by reading the disclosure provided herein. The method begins in step 201 in which control passes to step 210.

In step 210, a backup copy of an image of an application module, which needs to be upgraded, is stored in a non-volatile memory. The backup copy enables restoration of the application module if the upgrading operation of the application module fails. By storing in a non-volatile memory, the restoration may be performed even if system 100 is powered-off during the upgrade operation.

In step 220, the application module is upgraded using data provided externally. In the above example, compact disk 140 (or network interface 190) provides the data for upgrading the application module. In an embodiment, the application module is upgraded by replacing all the software instructions (representing the application module) with new instructions present in the upgrade file.

In step 240, a determination is made as to whether upgrading of the application module has failed. The determination may be made by using various approaches. An example approach is described in sections below. If the upgrading has failed, control passes to step 260, or else control passes to step 280.

In step 260, the application module is restored using the backup copy. In an embodiment described below, restoration merely requires copying the image stored in the backup copy to the locations (in flash memory 180) designed to store the corresponding application module.

In step 280, a determination is made as to whether there are additional application modules to be upgraded. If there are additional application modules to be upgraded, control passes to step 210, otherwise, control passes to step 299. Thus, steps 210–260 are repeated for each application module to be upgraded. The method ends in step 299. Thus, it may be appreciated that the backup copies can be used to effectively restore application modules if the upgrade operation fails (aborts) in the middle.

According to another aspect of the present invention, steps 240 and 260 are performed each time system 100 is initialized (powered-on or started). In other words, a determination is made as to whether an upgrade operation corresponding to any of the application modules has aborted in the middle, and the corresponding backup copy is used to restore the application modules.

As a result, even if application modules such as communication drivers are corrupted due to aborted upgrade operations, the application modules may be restored (potentially very easily), thereby restoring the entire operation of system 100. In addition, steps 240 and 260 would generally be performed ahead of steps 210 and 220 in effect. It may be further desirable to perform step 240 and 260 prior to performing each (set of) upgrade operations as a safety precaution.

The manner in which the above described features can be implemented is described below with examples.

4. Details of Implementation of System 100

Figure 3:
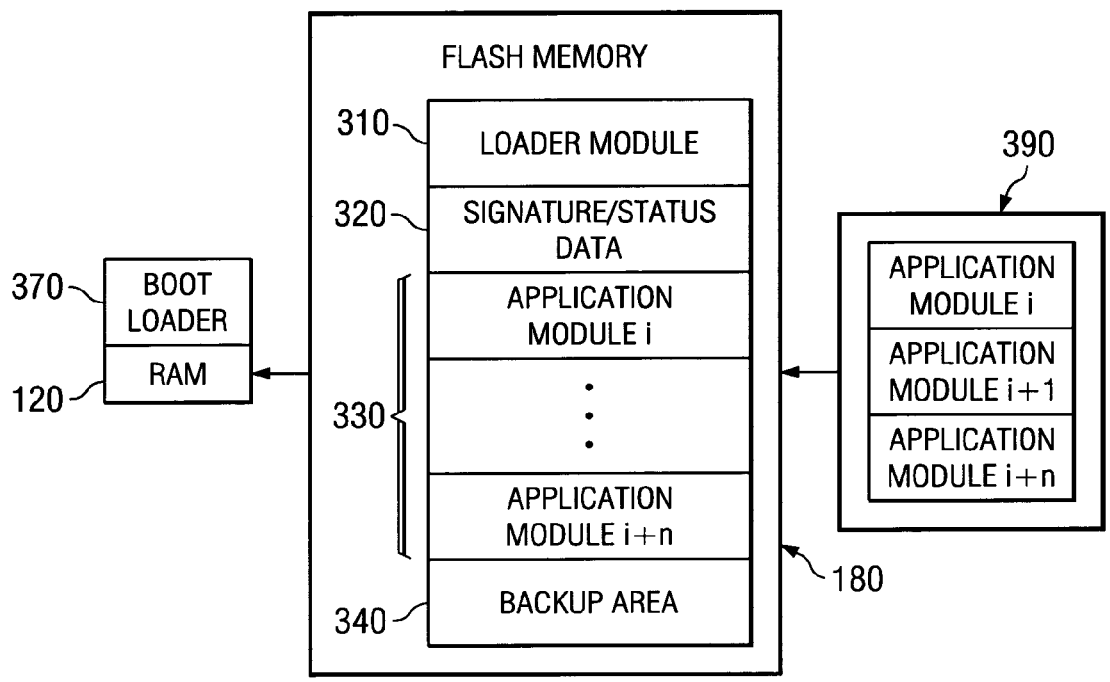
FIG. 3 is a block diagram depicting the manner in which upgrading operation is performed in an embodiment of the present invention.

FIG. 3 is a block diagram depicting the inter-relationship of various software/data components in system 100 in an embodiment of the present invention. FIG. 3 is shown containing boot loader 370, RAM 120, flash memory 180, upgrade file 390. Flash memory 180 in turn is shown divided into four areas—a first area containing loader module 310, second area containing status data 320, third area containing application modules i through i+n (collectively referred by 330, i and n being integers), and a fourth area referred to as backup area 340. Each component is described below in further detail.

Each application module is designed to perform a high level task independent of the operation of the other application modules, as noted above. In an embodiment, each application module is allocated a fixed memory space such that the application module may merely need to be replaced by the data representing a newer version (but within the allocated memory space).

Upgrade file 390 represents the data which is used for upgrading various application modules. In an embodiment, upgrade file 390 contains the data for upgraded version of the application modules, and upgrading merely requires replacing a copy of the application module in area 330 with the corresponding data in upgrade file 390. Upgrade file 390 may be provided by external media (for example, compact disk 140 in FIG. 1, or a software stored on a personal computer).

At the time of initialization of system 100, boot loader 370 causes execution of portions of software which in turn causes (in addition to initialization tasks) a determination of whether there are any failed upgrades (as described in further detail with reference to loader module 310), and cause the corresponding application modules to be restored based on backup copies present in backup area 340.

Boot loader 370 may be provided in ROM 170. Thus, when system 100 is initialized, processing unit 110 may be setup to automatically load boot loader 370 into RAM 120, and execute the instructions to restore copies of application modules corresponding to failed upgrade operation(s).

Backup area 340 provides non-volatile memory for storing a backup copy of an image (bytes in flash memory 180) of each application module before starting the corresponding upgrade operation. To optimally use the available memory space, the image data can be stored in a compressed format.

Figure 4:
FIG. 4 is a diagram illustrating the various data structures stored for reliably upgrading the firmware in an embodiment of the present invention.

Status data 320 stores various pieces of status information related to upgrading of application modules. In an embodiment shown in FIG. 4, a module status field is shown associated with each of the (n+1) application modules of area 330. Each module status may contain an upgrade bit, which is set to 1 when upgrading of the corresponding application module starts, and set to 0 when upgrading is completed. Thus, a value of 1 in an upgrade bit at the time of initialization of system 100 indicates that the upgrading operation of the corresponding application module has failed.

A compression bit (in the module status) indicates whether the backup copy is stored in compressed format or uncompressed format. In addition, module status field may include a version identifier of the present stored copy in area 330. In an embodiment, a fixed memory space (identified for example, by start address and length) is allocated for each application module. Accordingly data specifying the specific allocated memory space may be stored associated with each module.

A backup status bit in module status may indicate whether a backup copy has been stored for an application module prior to start of upgrading. The backup status bit may be reset once the upgrade operation is complete and/or the backup copy is deleted (for example because the copy is replaced by another application module). A backup area status field may contain data indicating the presently available backup copies and the time at which the copies have been stored. The number of bytes available for additional backup may also be indicated.

Loader module 310 operates to reliably upgrade any desired application modules (i, i+1, i+n) according to various aspects of the present invention, in addition to performing various other tasks as a part of initialization, etc. Such other tasks are not described in the present application, as not being relevant to an understanding of the present invention.

With respect to upgrading of application modules, upon initialization of system 100, (due to the operation of boot loader 370) loader module 310 may examine the upgrade bit (in module status of FIG. 4) of each application module to determine whether an upgrade operation of the application module has failed. If there is a failure, the backup area status field is examined to determine whether the backup copy exists in backup area 340. If the backup copy exists, the application module is restored by copying the backup copy to replace the version present in area 330.

Once initialization of system 100 is complete, loader module 310 may allow upgrading of any desired application modules. The desired application modules to be upgraded may be determined using several approaches. In an embodiment, an upgrade file may contain a version number (for each application module) and an upgrade operation is performed if the version number in the upgrade file represents a newer (or later) version compared to a corresponding version number stored in status data 320. Alternatively, the specific application modules to be upgraded may be determined based on a suitable user interface provided to a user of system 100.

Loader module 310 may upgrade each of the determined application modules as described with reference to FIG. 2. The status information described with reference to FIG. 4 and the backup copy present in backup area 340 may be used to restore any application modules corrupted due to failure of the corresponding upgrade operation. If system 100 is powered off in the middle of upgrades, the backup copy may be used to restore the corresponding corrupted application module as described above.

5. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of upgrading an application module in an embedded system, a previous version of said application module being stored in a firmware contained in said embedded system, said method comprising:

upon determination to upgrade the application module compressing said application module and storing a backup copy of said compressed application module in a non-volatile memory;

upgrading said application module to a newer version;

determining whether said upgrading has failed; and restoring said application module to said previous version using said compressed application module backup copy if said determining determines that said upgrading has failed.

2. A computer readable medium carrying one or more sequences of instructions for upgrading an application module in an embedded system, a previous version of said application module being stored in a firmware contained in said embedded system, wherein execution of said one or more sequences of instructions by one or more processors contained in said embedded system causes said one or more processors to perform the actions of:

upon determination to upgrade the application module compressing said application module and storing a backup copy of said compressed application module in a non-volatile memory;

upgrading said application module to a newer version;

determining whether said upgrading has failed; and restoring said application module to said previous version using said compressed application module backup copy if said upgrading has failed.

3. A method of upgrading an application module in an embedded system, a previous version of said application module being stored in a firmware contained in said embedded system, said method comprising:

upon determination to upgrade the application module selecting whether to compress a backup copy;

setting status data to indicate whether compression is selected;

if not compressing the backup copy is selected, storing a backup copy of said application module in a non-volatile memory;

if compressing the backup copy is selected, compressing said application module and storing a backup copy of said compressed application module in said non-volatile memory;

upgrading said application module to a newer version;

determining whether said upgrading has failed;

restoring said application module to said previous version using said backup copy if said determining determines that said upgrading has failed and compressing the backup copy is not selected; and restoring said application module to said previous version using said compressed application module backup copy if said determining determines that said upgrading has failed and compressing the backup copy is selected.

4. A computer readable medium carrying one or more sequences of instructions for upgrading an application module in an embedded system, a previous version of said application module being stored in a firmware contained in said embedded system, wherein execution of said one or more sequences of instructions by one or more processors contained in said embedded system causes said one or more processors to perform the actions of:

upon determination to upgrade the application module selecting whether to compress a backup copy;

setting status data to indicate whether compression is selected;

if not compressing the backup copy is selected, storing a backup copy of said application module in a non-volatile memory;

if compressing the backup copy is selected, compressing said application module and storing a backup copy of said compressed application module in said non-volatile memory;

upgrading said application module to a newer version;

determining whether said upgrading has failed;

restoring said application module to said previous version using said backup copy if said determining determines that said upgrading has failed and compressing the backup copy is not selected; and restoring said application module to said previous version using said compressed application module backup copy if said determining determines that said upgrading has failed and compressing the backup copy is selected.

* * * * *